US008654742B2

(12) United States Patent
Freear et al.

(10) Patent No.: US 8,654,742 B2
(45) Date of Patent: Feb. 18, 2014

(54) RECEIVER WITH HIGH PERFORMANCE CHANNEL ESTIMATION

(75) Inventors: Steven Freear, Shipley (GB); Spyros Konstantinidis, Shipley (GB)

(73) Assignee: PACE PLC, Saltaire, Shipley (GB)

(*) Notice: Subject to any disclaimer, the term of this patent is extended or adjusted under 35 U.S.C. 154(b) by 147 days.

(21) Appl. No.: 13/070,533

(22) Filed: Mar. 24, 2011

(65) Prior Publication Data
US 2011/0235729 A1  Sep. 29, 2011

(30) Foreign Application Priority Data

Mar. 24, 2010 (GB) .................................. 1004947.6

(51) Int. Cl.
*H04W 4/00* (2009.01)

(52) U.S. Cl.
USPC ......................................................... 370/332

(58) Field of Classification Search
None
See application file for complete search history.

(56) References Cited

U.S. PATENT DOCUMENTS

| 7,190,741 | B1 * | 3/2007 | Manning ...................... 375/324 |
| 7,257,167 | B2 * | 8/2007 | Lau .............................. 375/295 |
| 7,492,703 | B2 * | 2/2009 | Lusky et al. .................. 370/210 |
| 2004/0136349 | A1 * | 7/2004 | Walton et al. ................. 370/338 |
| 2008/0062888 | A1 * | 3/2008 | Lusky et al. .................. 370/252 |
| 2009/0003308 | A1 * | 1/2009 | Baxley et al. ................. 370/350 |
| 2010/0080114 | A1 * | 4/2010 | Ratnam et al. ................ 370/210 |

* cited by examiner

*Primary Examiner* — Anh-Vu Ly
(74) *Attorney, Agent, or Firm* — Head, Johnson & Kachigian, P.C.

(57) ABSTRACT

The invention relates to a method and apparatus for use in the channel estimating in a manner which reduces Bit Error Rate (BER) and/or Mean Square Error (MSE) and allows the channel estimation to be performed in an efficient manner but with reduced complexity. The method utilizes two phases, the first of which includes locating an optimum regularization parameters range from an initially larger range; and a second phase of obtaining optimum channel estimates from a Tikhonov regularized least squares solution using the optimum regularization parameters range located from the first phase.

13 Claims, 6 Drawing Sheets

RECEIVER WITH HIGH PERFORMANCE CHANNEL ESTIMATION

CROSS-REFERENCE TO RELATED APPLICATIONS

This application claims priority to United Kingdom Patent Application No. 1004947.6 filed Mar. 24, 2010 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention to which this application relates is broadcast receiver apparatus and a method of using the same wherein high performance channel estimation is enabled while minimising complexity.

2. Prior Art

Coherent communication systems are desirable for their theoretically and practically achievable high data rate, particularly when applied in Multi Input Multi Output (MIMO) Orthogonal Frequency Division Multiplexing (OFDM) systems in which channel estimation is a significant task to achieve high performance.

Fast fading channels are of particular interest as they represent mobile scenarios. Pilot symbol aided multiplexed (PSAM) channel estimation methods are of particular interest for fast fading channels in order to track channel variation. Many existing PSAM channel estimation methods are too computationally complex to be implemented, for example minimum mean square error (MMSE) where channel statistics and noise variance are required to be known or estimated a priori. Others, although low in complexity, often lack performance, for example least squares (LS) channel estimator Least squares (LS) channel estimation for MIMO-OFDM, although widely applicable for its low complexity, often involves the poorly-conditioned matrix inverse problem. The inverse solution of such a poorly-conditioned matrix can significantly degrade the overall system performance as it causes large channel estimation errors which have considerable adverse influence on system performance.

The following notation is used hereinafter:
E{•} denotes the statistical expectation;
$(•)^T$, $(•)^t$ and $(•)^t$ stand for transpose, pseudoinverse and hermitian operators respectively;
rank {•} and Tr{•} denote the rank and trace;
diag[x]stands for the diagonal matrix whose diagonal is x;
$I_N$ denotes N×N identity matrix.
A linear statistical model consists of an observation (y) that includes a model of signal component (x) and an error or noise component (w). This leads to a typical model expression:

$$y = x + w \text{ where } x = Ph$$

where P is the model matrix and h is the parameter vector. The above expression indicates that we are trying to estimate h from noisy observations y. Computation of least squares estimate of h will require to solve the signal inverse problem by computing the solution of a linear set of equations. The solution is then given by minimizing $(y-P\hat{h})^T(y-P\hat{h})$, leading to the well known analytical solution of a form $\hat{h} = (P^T P)^{-1} P^T y \Rightarrow \hat{h} = P^t y$, where $P^t$ is the pseudo-inverse of P.

When structuring the solution of the inverse problem by SVD factorization of $P^t$ we get:

$$\hat{h} = P^t y \qquad (a)$$
$$= W \sum^{-1} U^T y =$$
$$= \sum_i w_i \frac{1}{s_i} u_i^T y$$

where W and V are unitary matrices consisting of columns $w_i$ and $v_i$, respectively and $\Sigma$ is a matrix comprised of singular values (SV) of P on its diagonal. Here it is evident that the solution may be highly noise sensitive because of the possible small singular values $s_i$ in the singular values decomposition (SVD). The small singular values imply that P is poorly-conditioned for $s_i \square 1 \& s_i \neq 0$ (when $s_i = 0$, P is ill-conditioned), a common phenomenon in inverse problems. The poorly-conditioned P will introduce numerical stability problems to the model and degrades significantly the performance merit.

The process of computing the solution of the linear set of equations with poorly-conditioned set matrix is numerically highly unstable, in which case the estimate may be highly noise sensitive. Poorly-conditioned matrix inverse problems require regularization to prevent the solution estimate from being sensitive to noise in the data, otherwise the noise in the data is amplified in the solution estimate. This is the case for all inverse systems including the LS channel estimation method for MIMO-OFDM that typically involves large matrix inversion.

An aim of the present invention is to provide high performance channel estimation while minimising complexity.

SUMMARY OF THE INVENTION

In a first aspect of the invention, there is provided a method of channel estimation comprising:
  a first phase of locating an optimum regularisation parameters range from an initially larger range; and
  a second phase of obtaining optimum channel estimates from a Tikhonov regularized least squares solution using the optimum regularisation parameters range located from the first phase.

In one embodiment the Tikhonov regularized least squares solution is for the next OFDM blocks, typically as long as channel impulse response length remains unchanged.

Thus, in the first phase, the optimum regularization parameter range is estimated from the initial large range, and in the second phase the algorithm uses this reduced search range from the first phase to compute the best channel estimate by SVD implemented Tikhonov regularised least square solution (LS_TikSVD).

Thus a modified LS channel estimation algorithm is proposed by applying singular value decomposition implementation of Tikhonov regularization. The optimum regularization parameter is estimated efficiently and high performance gains are achieved at low complexity cost.

The optimum range is shown to be unchanged as long as the channel tap length can be assumed constant, thus making the algorithm applicable for practical implementation. The first phase contributes to reducing significantly the computation time and the second phase into providing the best channel estimate.

Thus the inverse problem is regularised, the numerical instability problem in the system is removed, and performance gains are achieved while maintaining low complexity.

This gives significant performance increase in both mean square error (MSE) of channel estimation as well as bit error rate (BER) performance of system, compared to conventional LS.

Typically the linear problem Ax=b is solved using an LS_TikSVD algorithm including the following steps:
(where $A=((F_{N_t}^P)^H P^H P(F_{N_t}^P))$, $b=((F_{N_t}^P)^H P^H)y_P$ and x=b)
  a. Normalize $\bar{A}=(1/Tr\{A\})\cdot A$, likewise modify b to $\bar{b}=b/Tr\{A\}$
  b. SVD Factorization of normalized A: $SVD(\bar{A})=U\Sigma W^H$
  c. Initial range of filtering parameters: alpha ($10^{-a(t)}$) for a(i) taking values form [−min(initial) to −max(initial)] linearly spaced with step size Z, therefore initial range of alpha: linspace[$10^{-min(initial)}$:$10^{-max(initital)}$:step(Z)]

For the Tikhonov filtering which is performed the method steps are, in one embodiment:
  a.1 Computation of best estimate solution:
    for i=1: length(alpha)

$x_{tik}(i)=W(:,i)\cdot(s_i^2/(s_i^2+alpha^2(i))\cdot 1/s_i)\cdot U^H(:,i)b$ a.2 Computation of residual error for each solution $x_{tik}$:

residual(i)=$\|Ax_{tik}(i,:)-b\|^2+\|alpha(i)\cdot x_{tik}(i,:)\|^2$ b. From residual v alpha curve (s-curve) find the local maximum and next local minimum (that is the valley bottom of the s_curve). Identifying indexes of alpha for the above locations: local maximum and valley bottom points, min_alpha and max_alpha respectively
  c. Defining new reduced range of filtering parameters alpha: New optimum alpha range: min_alpha to max_alpha.
  d. Go to step a.1 using the reduced range of alpha and compute channel estimate solution for the following OFDM blocks, as long as CIR length (L) is unchanged. If L changed go to b, to redefine optimum alpha range.
  e. end In one embodiment a good estimate of the channel impulse response length is 16 or 18.

Typically the method of channel estimation is utilised by a broadcast data receiver of the type which allows the data to be received from one or more transmitting locations and allow at least a portion of the data to then be processed in response to a user selection to view and/or listen to a particular channel to allow the generation of audio, video and/or auxiliary information therefrom. Typically the broadcast data receiver is connected to a display screen and speakers or is provided as an integral part thereof or is located in another item of apparatus connected thereto so as to allow the processed data to be viewed and/or listened to.

In a further aspect of the invention, there is provided a broadcast data receiver characterised in that the received data channels are estimated by:

a first phase of locating the optimum regularisation parameters range from an initially larger range; and a second phase of obtaining the channel estimates from a Tikhonov regularized least squares solution using the optimum regularisation parameters range located from the first phase.

BRIEF DESCRIPTION OF THE DRAWINGS

Further information and specific embodiments of the invention are now described wherein:—

DETAILED DESCRIPTION OF THE PREFERRED EMBODIMENTS

Figure 1:
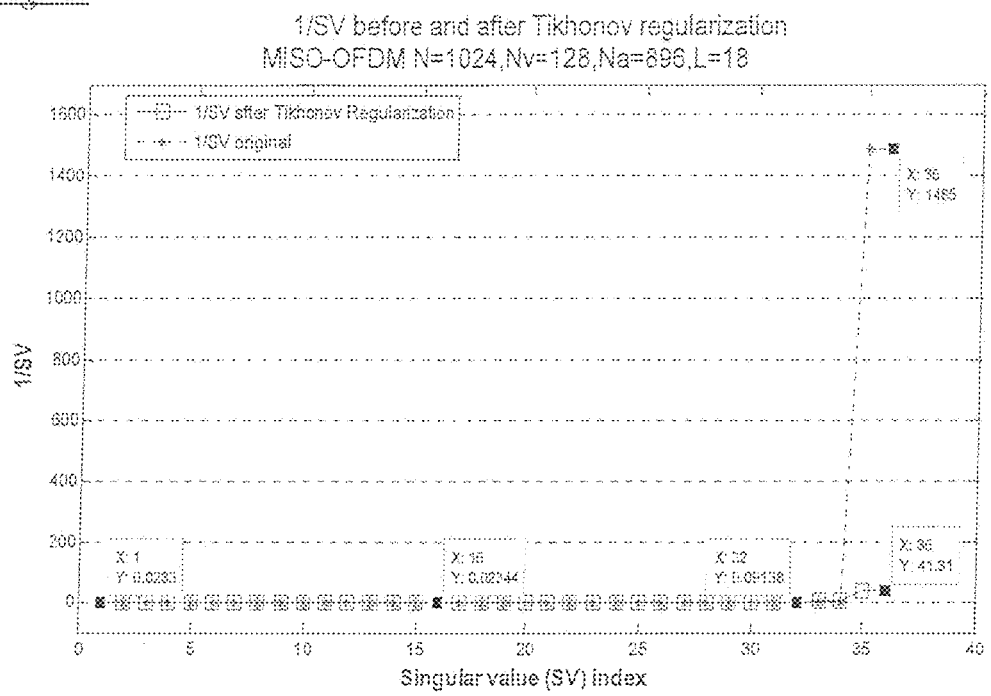
FIG. 1 illustrates a Tikhonov regularization parameter contribution on 1/SV.

An example of the invention is now described with reference to the accompanying Figures and description provided below.

Signal Model

If one considers a Multi Input Multi Output Orthogonal Frequency Division Multiplexing (MIMO OFDM) broadcast data system with $N_t$ transmit and $N_r$ receive antennas.

As the channel estimation procedure is performed at each receive antenna and is independent of the number of antennas, where the same principle of channel estimation is applied, a case of $N_r=1$ is be considered. A system of one receive antenna is hereinafter considered for illustrative purposes and to sustain simplicity of notations.

The row information bits are initially mapped to complex valued symbols on an M-ary modulation alphabet set, dependent on the modulation order (i.e. QPSK, M-QAM). BPSK modulated pilots are then multiplexed with the information symbols to produce the active data symbols. Virtual carriers are then appended and the data symbols are then multiplexed to N OFDM subcarriers via an N point inverse discrete Fourier transform (IDFT) to be transmitted through a wireless frequency selective channel.

The presence of reflecting objects and scatters in the wireless channel creates an environment where a radio signal is scattered and reflected by objects before it reaches the receiver. These effects result in multiple versions of the transmitted signal arriving at the receiver antenna. The multipath received signal that is the superposition of waves coming from all the different paths can be represented in the form of a frequency selective channel.

The frequency selective channels are modelled as finite impulse response (FIR) filters with complex channel impulse response (CIR) of $L_M \times 1$ vector $h_i = [h_i(0), h_i(1), \ldots, h_i(L_M-1)]^T$ with $L_M$ the length of the longest CIR of transmit-receive pair for i-th transmit antenna. In complex notation, the CIR of the multipath fading channel at time index n is expressed as $$h_i(n) = \sum_{l=0}^{L_y-1} h_i(l)\delta(n - \tau_i) \quad (1)$$

where $\tau_l$ is and $h(l)$ are the delay and complex amplitude of the l-th path, where $l = \{0 \ldots L_M-1\}$, and $\delta$ is the delta function. Subsequently the path amplitude of the vector $h_i \epsilon \square^{N \times 1}$ with $h_i = [h_i(0), \ldots h_i(L_M-1)]^T$ so $h_i(l)=0, \forall l \epsilon \{L_M \ldots N-1\}$, is used and where N is the total number of carriers of the ODFM symbol. It is assumed that the channel coefficients are mutually independent, wide sense stationary (WSS) circulant complex Gaussian random processes with zero mean and covariance $\sigma_h^2$. For convenience, perfect time synchronisation at the terminal of the OFDM system is assumed.

The signal is transmitted over a frequency selective, time varying channel, although the channel state is fixed over the duration of one frame but can change significantly for the next frames.

Defining N×N DFT-matrix as $F_{ik} = e^{-2jik/N}$, $j=\sqrt{-1}$, we can relate CIR to channel frequency response (CFR) as $$H_i(n) = F \cdot h_i = \sum_{l=0}^{L_y-1} h_i(l) e^{-j\frac{2 \times ni}{N}} \quad (2)$$

In order to ensure that no inter block interference (IBI) occurs, each OFDM block is preceded by cyclic prefix (CP) with a length of at least $L_M-1$, as long as the length of the CP is longer than the maximum path delay, then it is assumed that the inter carrier interference (ICI) caused by the Doppler offset is fully compensated for. At the receiver, first the cyclic prefix is removed and after the discrete Fourier transform (DFT), the received signal can be modelled as $$y(n) = \sum_{i=0}^{N_t} H_i(n) X_i(n) + w(n) \quad (3)$$

Equation (3) describes the received signal containing both useful data carriers ($K_i$) and pilot carriers ($P_i$) multiplexed in the transmitted OFDM symbol $x_i$. We can separate the received signal (3) into two parts that can model the data and pilot carriers as $$y(d_z) = \sum_{i=0}^{N_t} H_i(d_z) K_i(d) + w(d_z) \quad (4)$$

$$d = 0, \ldots, N_d - 1; d_z \in D$$

and $$y(p_z) = \sum_{i=0}^{N_t} H_i(p_z) P_i(z) + w(p_z) \quad (5)$$

$$z = 0, \ldots, N_p - 1; p_z \in P$$

where D and P denote data and pilot subsets respectively. $K_i(d)$ and $P_i(z)$ denotes the dth data symbol and the zth pilot symbol respectively, transmitted from the ith antenna and $w(n)$ is a vector of independent identically distributed complex zero-mean Gaussian noise with variance $\sigma_w^2$.

The received pilot symbols can be expressed in vector form as $$y_P = P(I_{N_t} \otimes F_P) h + w_P = P F_{N_t}^P h + w_P \quad (6)$$

where $y_P = [y(p_0), \ldots, y(p_{N_p-1})]^T$, $P = [P_1 P_2 \ldots P_{N_t}]$ in that $P_t = \text{diag}[P_t(0), P_t(1), \ldots P_t(N_p-1)]$, $h = [h_1^T \ldots h_{N_t}^T]^T$, $w_P = [w(p_0), \ldots w(p_{N_p-1})]^T$, $F_P$ is the submatrix of F composed from P rows and L columns. In (6) we substitute $(I_N \otimes F_P)$ by $F_{N_t}^P$, as well as we omit the antenna index for ease of notation.

Prior to channel estimation it is ensured that there is no interference within each of the receive antennas among the pilot symbols transmitted from different transmit antennas. Phase shift orthogonal pilot design is used, as multipath frequency selective channel is assumed, to prevent interference between pilots from different transmit antennas at the receiver antenna. The use of equispaced and equipowered pilot design [4],[5] can prevent any system complexity increase related to pilot design [6]. Phase shift orthogonal design is then represented by pilot symbols:

$$P_i(z) = \sqrt{\frac{\sigma_P}{N_p}} e^{-j\frac{2\pi n_i z}{N_p}}, z = 0, \ldots, N_p - 1 \quad (7)$$

where $i=1, \ldots, N$, (transmit antenna index), $n_i=(i-1)L$ (indicating spacing within OFDM), $\sigma_P$ is the total power of pilot carrier of each OFDM block. With this pilot design method each antenna will transmit pilot symbols with non-zero values for any time slot allocated to pilots. It is assumed that all pilot signals are placed on the same subcarriers in the same OFDM symbol for the $N_t$ transmit antennas. This scheme ensures no interference among pilots transmitted from different transmit antennas as they sustain orthogonality.

Based on the system model of (6) we can obtain the LS estimate of h as $$\hat{h} = ((F_{N_t}^P)^H P^H P(F_{N_t}^P))^{-1} \cdot (F_{N_t}^P)^H P^H y_P \quad (8)$$

and in frequency domain:

$$H_r(n) = f_n \hat{h}_i \quad (9)$$

where the $f_n = F(n,:)$ defines the nth row of the subset matrix $F(n,L)$, referring to the nth symbol. For the channel to be identifiable, the necessary condition in (8) is the full rank $P(F_{N_t}^P)$ (i.e. rank$\{P(F_{N_t}^P)\} = N_t L$) which requires for $N_P \geq N_t L$. The condition of $N_P = N_t L$ is therefore used herein to maximize the bandwidth efficiency.

In what follows we can derive the mean MSE of the LS channel estimator of (8) as:

$$MSE_{H_p} = \frac{1}{LN_t} E\{\|\hat{h} - h\|^2\} \quad (10)$$

$$= \frac{\sigma_w^2}{LN_t} Tr\left((PF_{N_t}^P)^H (PF_{N_t}^P)\right)^{-1}$$

and we can extend this expression to the average MSE of $\hat{H}_t(n)$ at the data location as:

$$MSE_{H_4} = \frac{\sigma_w^2}{N_d N_t} Tr\left(F_{N_t}^D (PF_{N_t}^P)^H (PF_{N_t}^P)(F_{N_t}^D)^H\right)^{-1} \quad (11)$$

The inverse problem present in LS estimation (8) that leads to numerical stability problems can significantly degrade the MSE of channel estimation and the BER performance of system.

In accordance with the invention there is provided the provision of LS channel estimation using SVD-Tikhonov regularisation. Poorly-conditioned matrix inverse problems require regularization to prevent the solution from being sensitive to noise in the data.

The SVD implementation of Tikhonov regularization method is in accordance with the invention provides a solution to the inverse problem in LS estimation. This results in significantly reduced complexity Tikhonov regularization that implements SVD matrix factorization and deals with the problematic small singular values. The computation time for the optimal regularization parameter is significantly reduced as characteristic behaviour of the proposed LS_TikSVD algorithm is observed. This significantly reduces the search range for the optimum regularization parameter which, in turn, contributes in locating the small region of optimal regularization parameters that depends on the CIR length (L) with significant performance boost in both MSE and BER. The LS estimation approach solution is given by minimising the normal equation of (6) $y_P = PF_{N_t}^P h$. The channel estimate h can be seen as the superposition of true channel $h_{true}$ and the error channel $h_{error}$, therefore we can show that $$h = h_{true} + h_{error} = (PF_{N_t}^P)^t (y_P + \varepsilon) \quad (13)$$

thus $$h = (PF_{N_t}^P)^t y_P + (PF_{N_t}^P)^t \varepsilon \quad (14)$$

and $$h_{error} = (PF_{N_t}^P)^t \varepsilon \quad (15)$$

where $\varepsilon$ is the noise in the model. To simplify notation we can set matrix $(PF_{N_t}^P) = (A)$ and bring the term (6) into typical $Ax = b$ form: $Ab = y_P$ and then rewrite the term (15) as $$h_{error} = (A)^t \varepsilon \quad (16)$$

The pseudo-inverse $(A)^t$ can be calculated with singular value decomposition (SVD). SVD factorization of A can be expressed as $A = U\Sigma W^H$, where u (dimension $N_tL \times N_tL$) and w (dimension $N_tL \times N_tL$) are unitary matrices and E is a diagonal matrix (dimension $N_tL \times N_tL$) containing $N_tL$ singular values $s_t$ of A.

The singular values SV are sorted out by their value, where the largest and $s_k$ is the smallest (where index for is $k = N_tL$). Therefore $A^t$ can be expressed as $A^t = W\Sigma^{-1}U^H$.

Thus term (16) can be represented as $$h_{error} = (A)^t \varepsilon \quad (17)$$

$$h_{error} = W \sum\nolimits^{-1} U^H \varepsilon$$

$$\underbrace{W^H h_{error}}_{\tilde{h}} = \sum\nolimits^{-1} \underbrace{U^H \varepsilon}_{\varphi}$$

Using the orthonormal properties of unitary matrices W and U, we can show that $\|h_{error}\|_2 = \|\tilde{h}\|_2$ and $\|U^H \varepsilon\|_2 = \|\phi\|_2$. This reveals that the crucial step in term (17) is the inverse of $\Sigma$ as:

$$\|h_{error}\|_2^2 = \sum_{i=1}^{k} \left(\frac{\varphi_i}{s_i}\right)^2 \quad (18)$$

The smaller the SV, the more numerical error in the right hand side of term (18) (i.e. $\phi_i$) is amplified in the left hand side of term (18) result (i.e. $h_{error}$). It can therefore be seen that channel estimates can be sensitive to numerical stability.

The measure of numerical stability is given by conditional number (cond) which is calculated by the ratio between the largest and the smallest SV. From term (17) we can write $$\|h_{error}\|_2^2 = \left\|\sum\nolimits^{-1} \varphi\right\|_2^2 \quad (19)$$

where $$\sum = \begin{bmatrix} s_1 & 0 & 0 \\ 0 & \ddots & 0 \\ 0 & 0 & s_k \end{bmatrix} = s_1 \begin{bmatrix} 1 & 0 & 0 \\ 0 & \ddots & 0 \\ 0 & 0 & 1/cond \end{bmatrix},$$

therefore $$\sum\nolimits^{-1} = 1/s_1 \begin{bmatrix} 1 & 0 & 0 \\ 0 & \ddots & 0 \\ 0 & 0 & cond \end{bmatrix} \quad (20)$$

Equation (20) shows the effect that large cond can have on the estimation error. We can see the significant impact of the conditional number on the estimation error by rewriting term (19) using term (20)

$$\|h_{error}\|_2^2 = 1/s_1^2 \sum_{i=1}^{k} \left(\frac{s_1^2}{s_i^2}\right) \varphi_i = 1/s_1^2 \left(\frac{s_1^2}{s_1^2} \varphi_1^2 + \ldots + cond^2 \cdot \varphi_k^2\right) \quad (21)$$

where $cond = s_1/s_k$. It is therefore clear that the conditional number has a clear influence on the estimation error and therefore degrades the MSE of channel estimation and BER system performance.

The Tikhonov regularization method is an approach to solving matrix inverse problems and numerical instabilities. The representation of Tikhonov regularized solution [14] of term (6) is given as $$h_{Tik\_\alpha} = \arg\min_{k \in H} \left[\|PF_{N_t}^p h - y_\rho\|_Y^2 + \alpha^2 \|h\|_H^2\right] \quad (22)$$

where Y and H assumed to be Hilbert spaces and the $h_{Tik\_a}$ is the best solution for the regularization parameter ($\alpha$) with criterion of the minimum solution norm. Re-adopting the simplified notation of $(PF_{N_t}^P)=(A)$, the term (22) reduces to analytical solution:

$$h_{Tik\_a}=((PF_{N_t}^P)^H PF_{N_t}^P \alpha^2 I_{NtL})^{-1}(PF_{N_t}^P)^H y_P$$

or $$h_{Tik\_a}=((A)^H A+\alpha^2 I_{NtL})^{-1}(A)^H y_P \quad (23)$$

The regularized solution estimate $h_{Tik\_a}$ in term (6) is the one to fit $y_P$ in least-squares sense as well as penalizing both solutions of large solution norm (i.e. $\|h\|^2$) and large residual error. It can be noted that term (22) is created by augmenting the ordinary least squares problem of term (6) into the following form $$\min \left\| \begin{bmatrix} A \\ \alpha I_{NtL} \end{bmatrix} h - \begin{bmatrix} y_P \\ 0 \end{bmatrix} \right\|_2^2 \quad (24)$$

Then as long as regularization parameter $\alpha$ is non zero, the last n rows of matrix in term (24) are linear and independent, thus ensuring full-rank of the problem and least squares problem can be solved by computing the linear set of equations:

$$((A)^H A+\alpha^2 I_{NtL})h=(A)^H y_P \quad (25)$$

By applying SVD factorization of $A=U\Sigma W^H$ in term (25) we can derive the SVD implementation of the Tikhonov regularization (LS_TikSVD) solution, by $$((A)^H A + \alpha^2 I_{NtL})h = \quad (26)$$
$$(A)^H y_P \Rightarrow \Leftrightarrow ((U\sum W^H)^H U\sum W^H + \alpha^2 I_{NtL})h$$
$$= (U\sum W^H)^H y_P \Rightarrow \Leftrightarrow h_{Tik\_SVU\_a}$$
$$= W(.,i) \sum_{i=1}^{k} \frac{s_i^2}{s_i^2+\alpha^2} \frac{1}{s_i} U(.,i)^H y_P$$

where $s_i^2/((s_i^2+\alpha^2)s_i)$ is the filter coefficient that controls the effect of small singular values on the solution estimates for large singular values $s_i \square \alpha$, $s_i^2/(s_i^2+\alpha^2) \approx 1$ and for small singular values $s^i \square \alpha$, $s_i^2/(s_i^2+\alpha^2) \approx 0$. This implies that those singular values smaller than regularization parameter alpha ($\alpha$) are filtered out while retaining components that are large. For singular values between the two extremes, as $S_i$ decreases the $s_i^2/(s_i^2+\alpha^2)$ decreases monotonically. This monotonically decreasing $s_i^2/(s_i^2+\alpha^2)$ produces a smooth cut-off (or corner) frequency filtering (smooth regularization).

The filtering parameter has a significant effect on the estimation error in term (21) as it contributes to suppress error propagation and error amplification from the small SVs. The optimum filtering parameter will suppress numerical instability in the inverse problems and therefore influences the MSE on estimation and BER performance.

A typical contribution of Tikhonov regularization in rectifying small singular values in $\Sigma^{-1}$ is shown in FIG. 1. In FIG. 1 it can be seen that small SVs are modified so the result of 1/SV after Tikhonov is much smaller than the original 1/SV but the large singular values are remained unchanged.

It is thus clear that the problem of channel estimation is reduced to first establishing the optimum regularization parameter and then to obtaining the best channel estimate.

Optimum Parameter Estimation and Simulation Results

Prior to describing the optimum regularization parameter estimation and the best channel estimate solution of LS_TikSVD through simulation results, it is useful to present the system setup of the evaluated schemes.

For the simulation setup consider an OFDM uncoded system with two transmit antennas and one receive antenna. Channels of different transmit-receive antenna pairs are assumed to be statistically independent as well as all $h_i(l)$ are uncorrelated. All channel coefficients are also assumed to be zero-mean complex Gaussian random variables with exponential power delay profile $E\{|h^i(l)|^2\}=\gamma\exp(-\xi l)$, $l=0, \ldots L_M-1$, $0<\xi<1$ (i.e. $\xi=0.2$) and $\gamma$ is a scalar factor such as to ensure that $\Sigma_o^{L_M-1} E\{|h(l)|^2\}=1$. An OFDM system, is implemented with a total of N=1024 carriers, of which $N^v=128$ are used as virtual carriers allocated at the edges of the OFDM symbol (as the IEEE 802.16 standard implies), with the rest of the carriers allocated to data and pilot symbols. An equispaced, equipowered phase shift orthogonal pilot design is used with $N_P=N^tL$, number of pilots for maximum bandwidth efficiency where the pilot power $\sigma_P^2$ per antenna is set to 3.5% of total transmit power $\sigma_d^2$ for L=16 and $\sigma_d^2$=4% of a for L=18. QPSK modulation is used for the data carriers ($N_d$).

Two Channel Impulse Response (CIR) length scenarios of L=16 and L=18 are considered in the simulations and the performance of the proposed LS_Tik_SVD estimation is evaluated in comparison to conventional LS estimation for both NMSE of channel estimation and BER of the system. Simulation results are taken over 10000 random channels.

Estimating the optimum regularization parameter is the first step towards computing the best channel estimate solution of the LS_TikSVD algorithm. Efficient estimation of the regularization parameter $\alpha$ is important. Conventionally, obtaining the optimum regularization parameter will normally require computing the LS_TikSVD for each different, and usually large, numbers of regularizing parameters through exhaustive search. This would make the computational cost extremely high. Thus an efficient method is needed to estimate a much smaller searching range for regularization parameters and this method in accordance with the invention is now described. This is a non trivial procedure as these optimum filtering parameters can be any positive non-zero numbers ($\alpha>0$). To overcome this problem the regularization parameter needs to be estimated more efficiently.

The novel approach to efficiently estimate the optimum regularization parameter comes from the fact that there is a distinct small number of regularization parameters that can be used to determine the optimum regularization parameter. This small number of regularization parameters is shown to be unchanged when the channel length remains constant. This is verified by simulation for a large number of random channels.

The details of the proposed approach are given below where a local minima/maxima algorithm is sufficient instead of an exhaustive search.

Plotting the curve of LS_TikSVD residuals versus regularization parameters (which will be referred to as the s-curve) we see some valuable characteristics of the resulting curve. These s-curve plots for L=16 and L=18 are shown in FIGS. 2 and 3 respectively.

Figure 2:
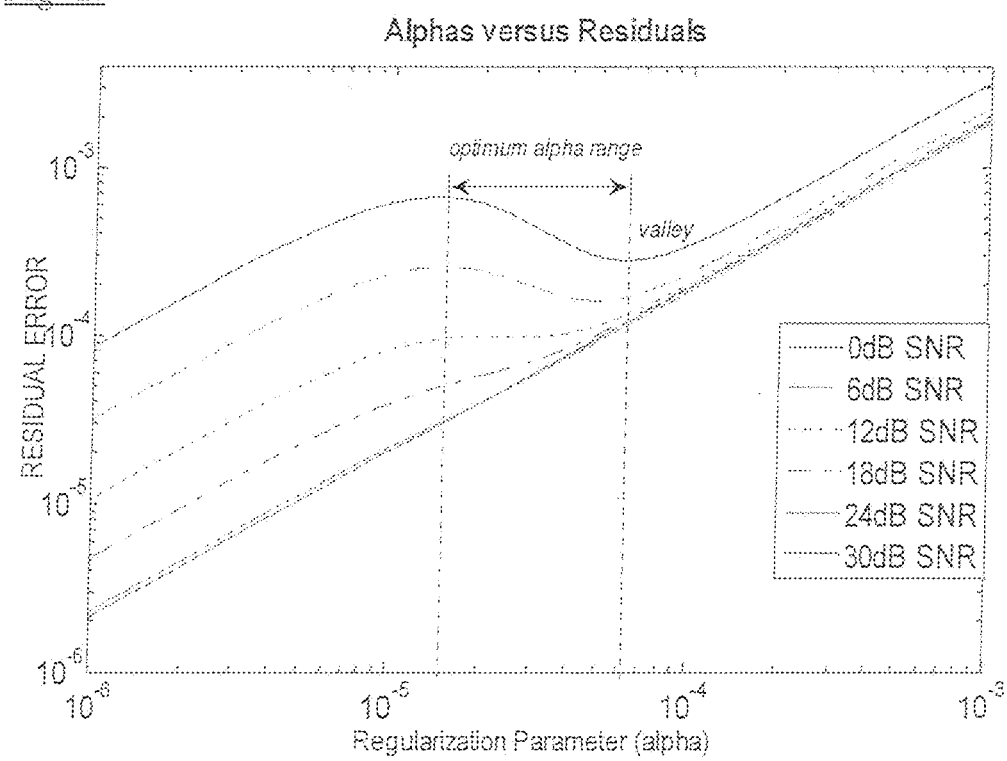
FIG. 2 illustrates an S-curve for L=16 LS_TikSVD, showing the residuals for the larger initial range of regularization parameters (alpha) for 0:6:30 dB SNR, and the optimum alpha range selected therefrom.
Figure 3:
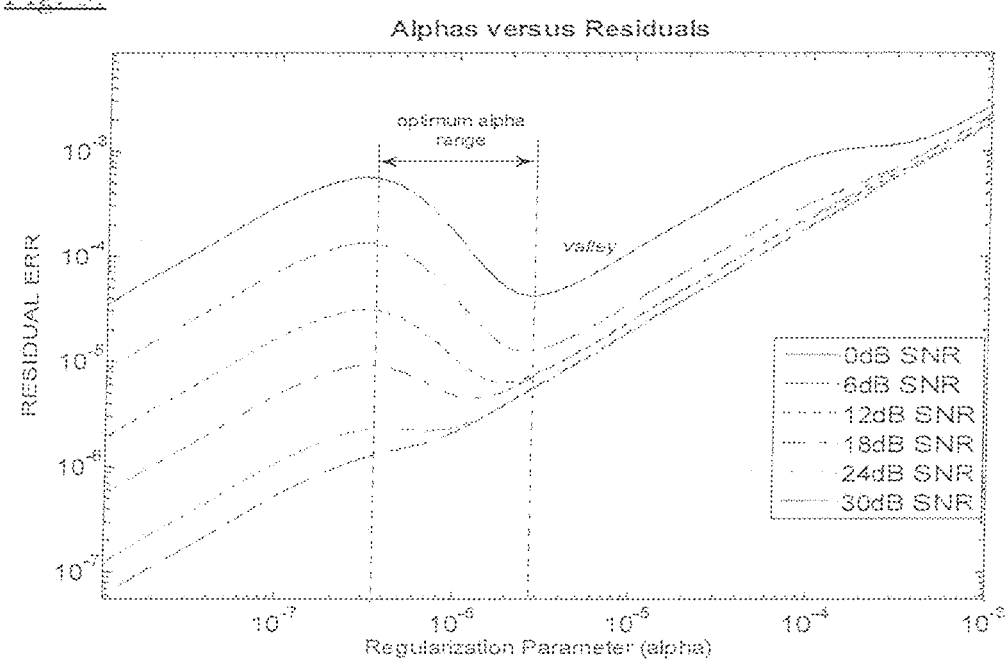
FIG. 3 illustrates the S-curve for L=18 LS_TikSVD, showing the residuals for the larger initial range of regularization parameters (alpha) for 0-30 dB SNR, and the optimum alpha range selected therefrom.

In FIGS. 2 and 3 the residuals of the proposed LS_TikSVD estimation are seen when using all the regularization parameters in the initial large range form $10^{-8}$ to $10^{-3}$ linearly spaced with 1000 steps, for different SNRs. Two valuable observations can be made from these curves:
(a) the valley (see FIG. 2 and FIG. 3) of the s-curves doesn't move significantly as the SNR increases but only slides marginally to smaller alphas, and loses its depth with the increase of SNR which eventually vanishes at high SNR range; and (b) the valley in the s-curves is moving to the left of the x-axis (to smaller alphas) for increasing L and to the right (larger alphas) for decreasing L.

The common observation is that the general shape of the s-curves in both cases (L=16 and L=18) is similar, with a difference being that the curve flattens faster (at lower SNR values) for shorter channel length L, and sustains its curvature (valley) for longer channel length L. The above observations aid in the generalizing of the principle of locating the region of optimum alpha range and illustrate the relatively predictable nature of the s-curve when L is changed.

Figure 4:
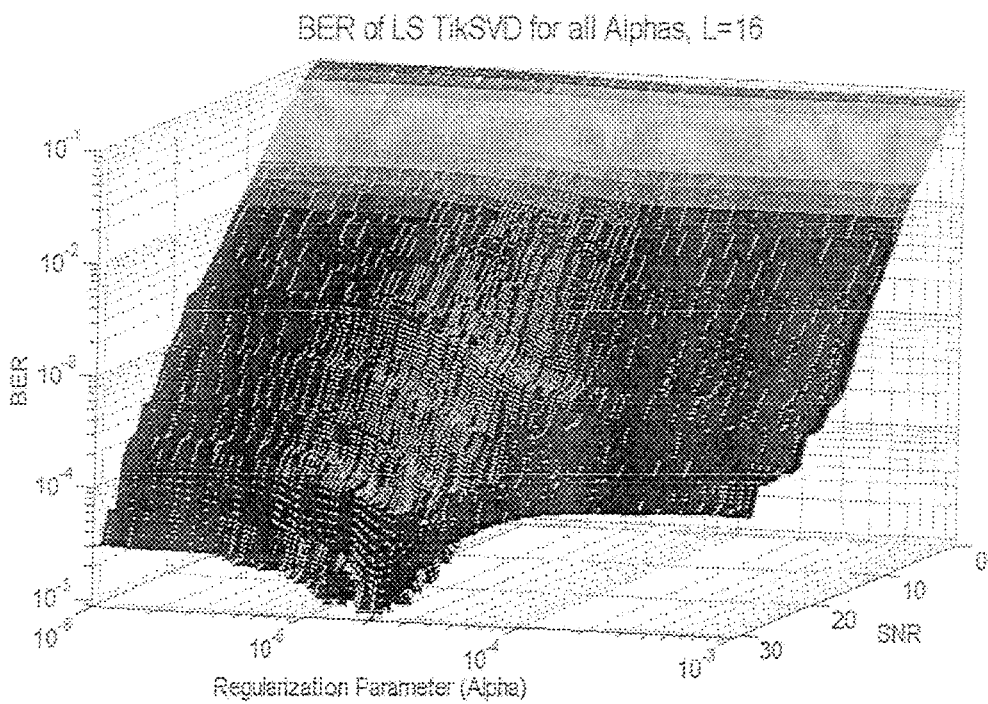
FIG. 4 illustrates BER performance of LS_TikSVD for the entire range of regularization parameters for L=16.
Figure 5:
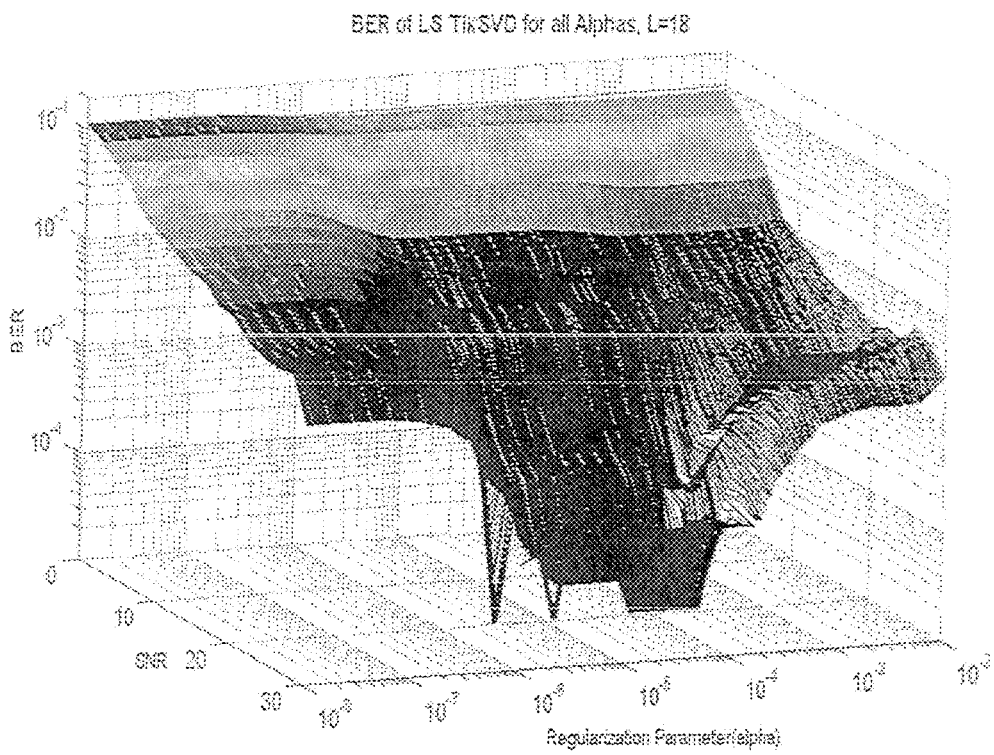
FIG. 5 illustrates BER performance of LS_TikSVD for the entire range of regularization parameters for L=18.

In the simulations shown in FIGS. 4 and 5 it can be seen that there is a direct link between the regularization parameters corresponding to the valley locations (of FIG. 2 and FIG. 3) with the BER performance of the system. FIGS. 4 and 5 show the BER performance of the LS_TikSVD estimation for all regularization parameter values from $10^{-8}$ to $10^{-3}$ and which are linearly spaced over 1000 steps.

Figure 6:
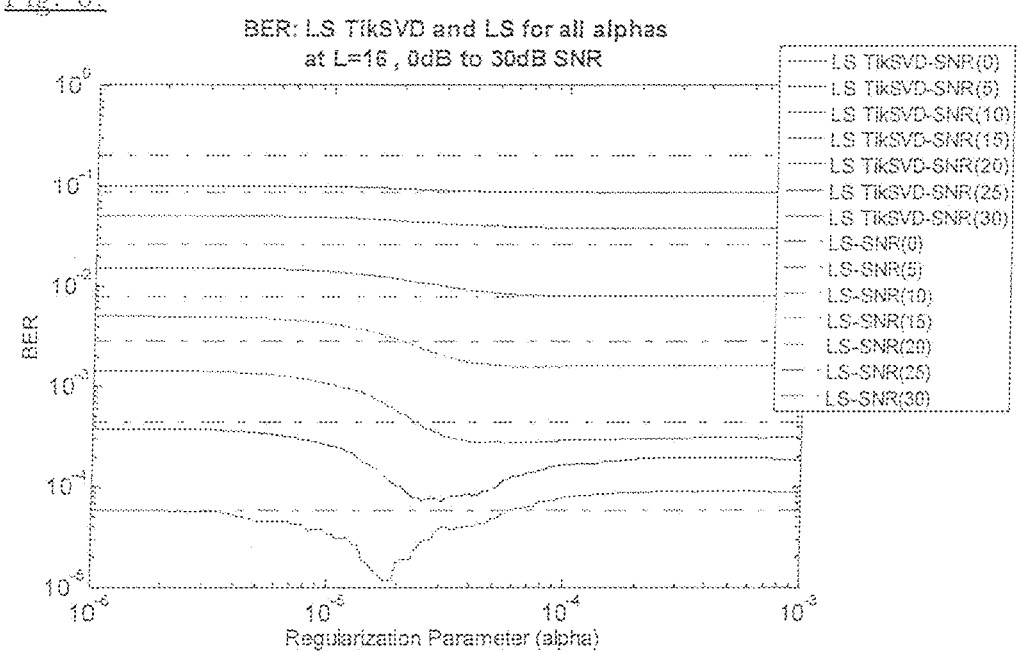
FIG. 6 illustrates BER performance of LS_TikSVD (solid line) and the LS (dashed line) for L=16.
Figure 7:
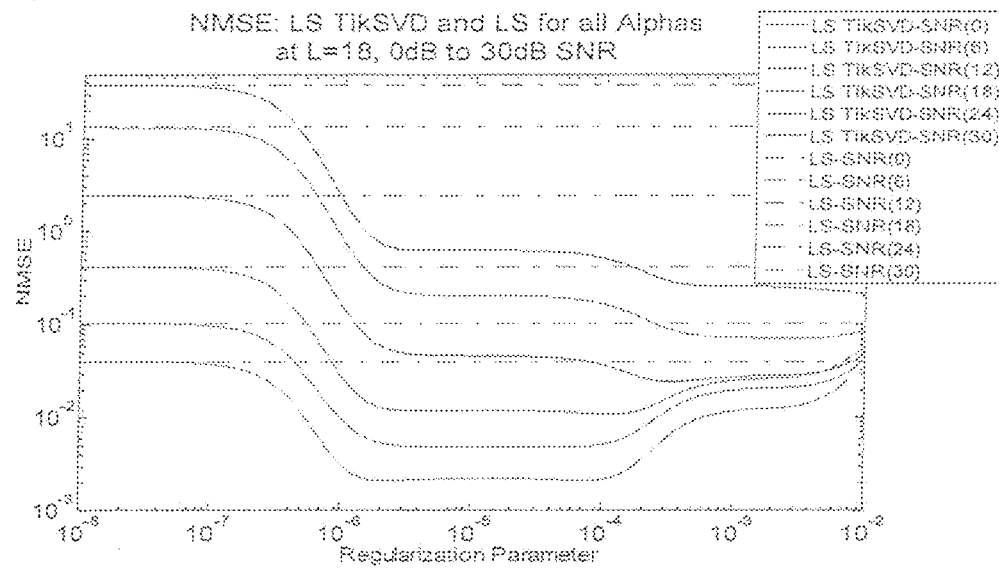
FIG. 7 illustrates BER performance of LS_TikSVD for the entire range of regularization parameters for. L=18.

In both FIGS. 4 and 5 a better BER performance of the data transmission system is seen over the range of regularization parameters located in the valley location. In FIGS. 6 and 7, 2D representations of FIGS. 4 and 5 are plotted as well as the analogous performance of the LS estimation. Whereas in FIGS. 8 and 9 the NMSE of the proposed LS_TikSVD are plotted compared to LS estimation.

In FIG. 6 it can be seen in more detail that the BER contribution of LS_TikSVD performance gain over the typical BER of LS and the optimum regularization parameter is related to best performance. First, in FIGS. 6 and 7 it is observed that there is a constant gain in low SNRs for almost the entire range of alphas. This difference in BER performance of LS_TikSVD and LS can be explained from term (21) as the high noise power (in LS) is amplified in presence of a high cond. Thus using the optimum regularization parameter we contribute to reducing the cond by rectifying the small SVs and therefore preventing the estimation error amplification. The LS_TikSVD and LS lines in FIGS. 6 and 7 will eventually meet as the regularization parameter approaches very close to zero.

For higher SNRs the contribution of noise to the channel estimation error is not as much as the contribution of inverse problem (i.e. high cond). Thus at the high end of the regularization parameter the BER in both FIGS. 6 and 7 is actually worst for the LS; this is because high alphas introduce interference error in the channel estimate. However there is a clear range of alphas for which a significantly high gain in performance can be achieved, 5 dB and 15 dB for L=16 and L=18, respectively.

Figure 8:
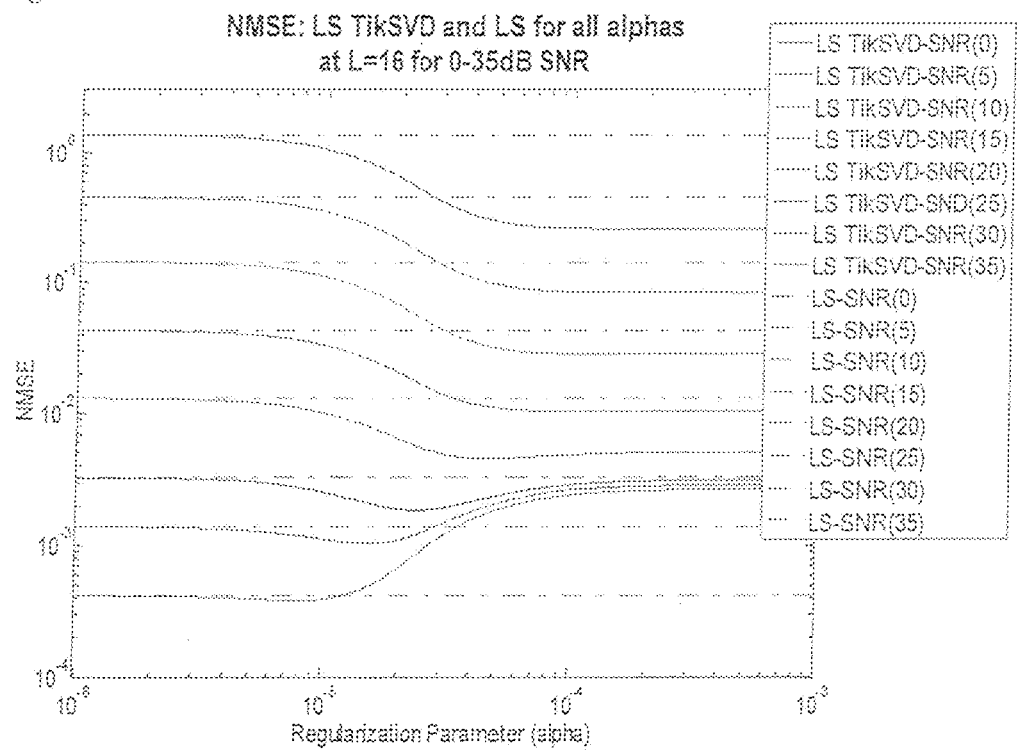
FIG. 8 illustrates NMSE for LS_TikSVD and LS for all alphas for L=16.
Figure 9:
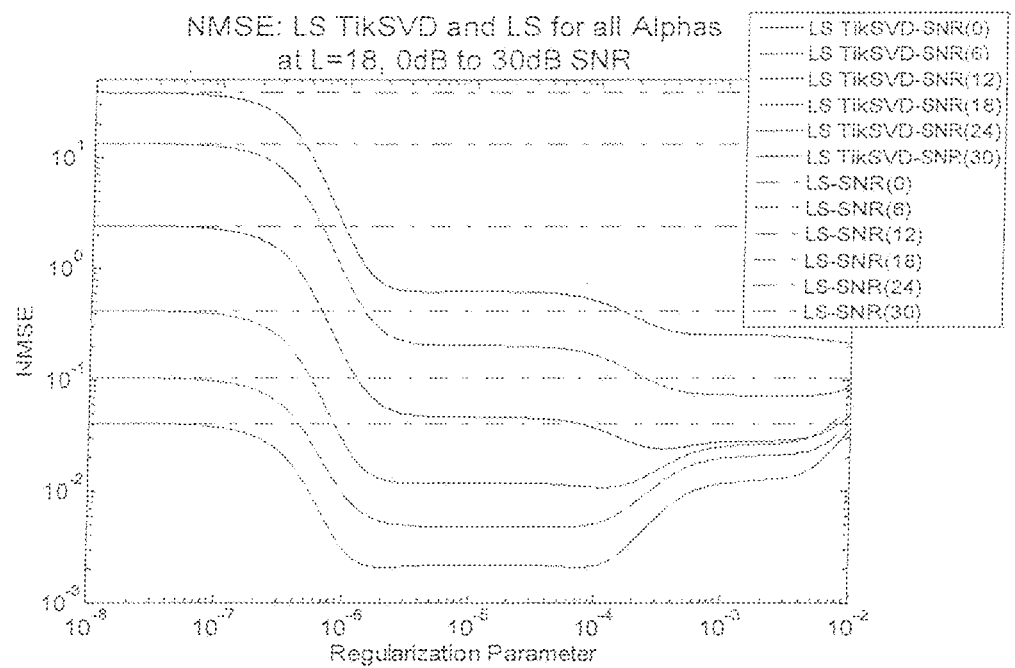
FIG. 9 illustrates NMSE for LS_TikSVD and LS for all alphas for L=18. The dashes arrow indicates the raff optimum alpha for all SNRs.

In both FIGS. 8 and 9 the performance of the inventive method can be seen compared to typical LS in the NMSE sense. In FIGS. 8 and 9 we can see why we have the analogues performance gains of FIGS. 6 and 7, respectively.

In FIG. 8 we see that at low/mid SNR range. (0-20 dB) almost the entire range of regularization parameter provides a gain when compared to LS. As alpha approaches zero (i.e. $\alpha<10^{-6}$) the contribution of LS_TikSVD tends towards LS, as can be verified in term (23).

At a high SNR range (above 20 dB) large alphas introduce additional interference errors on the estimate but there is a range of optimum alphas that provides a significant gain of almost 5 dB.

In FIG. 9 we see analogous behavior to that of FIG. 8, but as the matrix inverse problem for a system with L=18 is more poorly conditioned than when L=16 and thus have a higher amplification of the error. As a result the contribution of regularization is more evident. LS_TikSVD outperforms the IS for almost the entire range of alpha (up to $\alpha>10^{-7}$) but there is an optimum range of regularization parameters that provides the best channel estimate and gain over 15 dB.

From the above simulations the contribution of the inventive method for both performance gains in channel estimation NMSE and BER of the system can be seen. The problem remains in the computational expense of searching for the optimum regularization parameter from the entire initial range to compute the best channel estimate solution of LS_TikSVD. On the other hand, only a small number of alphas would provide the desired estimation solutions. These alphas correspond to the valley location of the s-curve. There are some special characteristics of the s-curves (noted earlier as properties a and b). In accordance with the invention the optimum regularisation parameter search can be reduced to a much smaller range as is now described.

The optimum range of alphas is located from the valley bottom to the local maximum of the s-curve. This is the optimum alpha range as the valley in FIGS. 2 and 3 that is sliding toward the local maxima point provides a regularization parameter with the best system performance. The optimum alpha range is defined as the range for which LS_TikSVD provides the best channel estimate solutions and hence best performance gains. Therefore it is not necessary to perform a complete search for the optimum alpha for all the channel estimation procedure (i.e. it is not necessary to perform an exhaustive search) but instead it is necessary to search only once and then define the optimum range for the rest of the OFDM blocks. The steps of the 2 phase algorithm used are indicated above, with reference to solving the linear problem Ax=b using an LS_TikSVD algorithm.

The LS_TikSVD algorithm comprises of two phases. The first phase (ph_1), comprised of steps a to c, involves the estimation of optimum alphas range and the second phase (ph_2) comprised of steps a.1 to e, involves the LS_TikSVD channel estimation using the estimated optimum alphas range obtained from ph_1.

In ph_1, the normalizations of A is performed followed by SVD factorization (SVD($\tilde{A}$)), then the initial range of regularization parameters is initiated and LS_TikSVD (26) is applied for each regularization parameter. Next, the residual error is computed (given in step a.2) for each alpha. The residuals and regularization parameters are used to define the new search range (optimum alphas range) bounded in the region of s-curve corresponding to its valley bottom and local maximum for alpha_max and alpha_min, respectively. The algorithm enters ph_2 for the rest of the LS_TikSVD channel estimation using the optimum alpha range. It is worth noting that the normalization and SVD factorization of A is only computed once in the ph_1 and doesn't need to be recomputed in phase 2. As long as CIR length (L) is unchanged the algorithm is located in second phase and provides with best channel estimates form LS_TikSVD regularized least squares solutions for the next OFDM blocks, otherwise if CIR length is changed the algorithm re-enters ph_1 to re-estimate optimum alphas range and then follows to ph_2 for channel estimation.

Below are shown the simulation results once in the second phase of LS_TikSVD algorithm i.e. operation is in the optimum alphas range. The estimated optimum alphas range from evaluated schemes for systems with CIR length L=16 and L=18 in FIGS. 1 and 2, are opt_alpha_L16=linearly_spaced {1.4e-5: 6.1e-5,step=90} and opt_alpha_L18=linearly_spaced {3.2e-7: 2.7e-6,step=165}, respectively. Thus the optimum alpha range reduces the number of regularization parameters for the optimum alpha search, to 90 (for L=16) and 165 (for L=18) search points from the initial 1000 (in the simulation).

Figure 10:
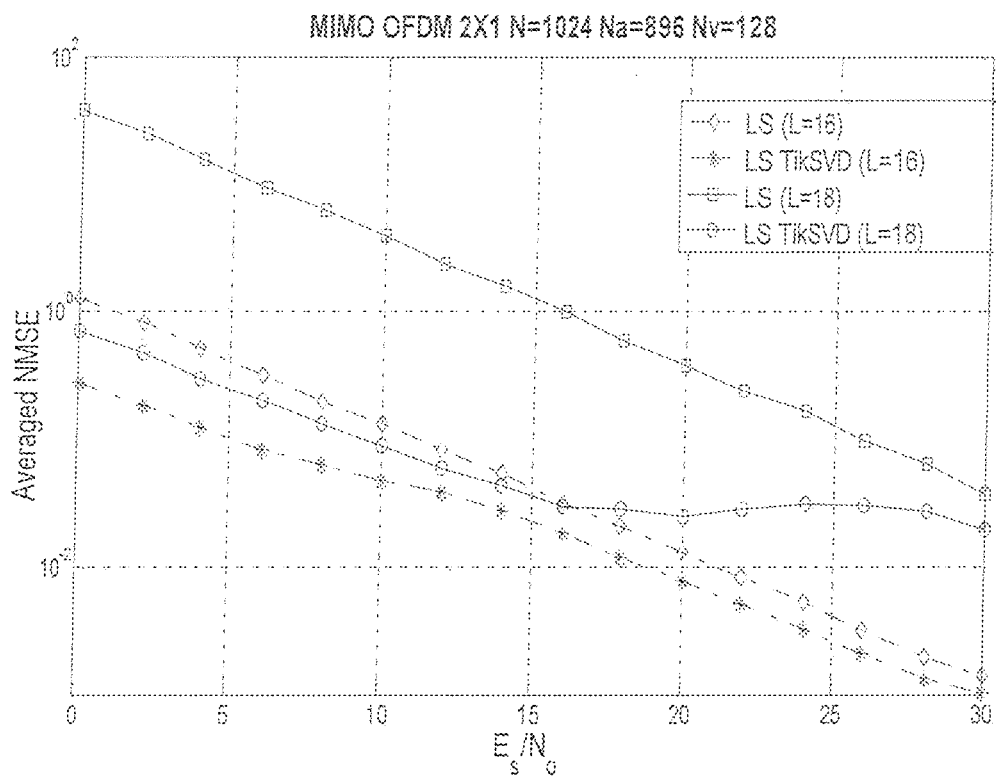
FIG. 10 illustrates the average MSE of the LS_TikSVD and conventional LS.
Figure 11:
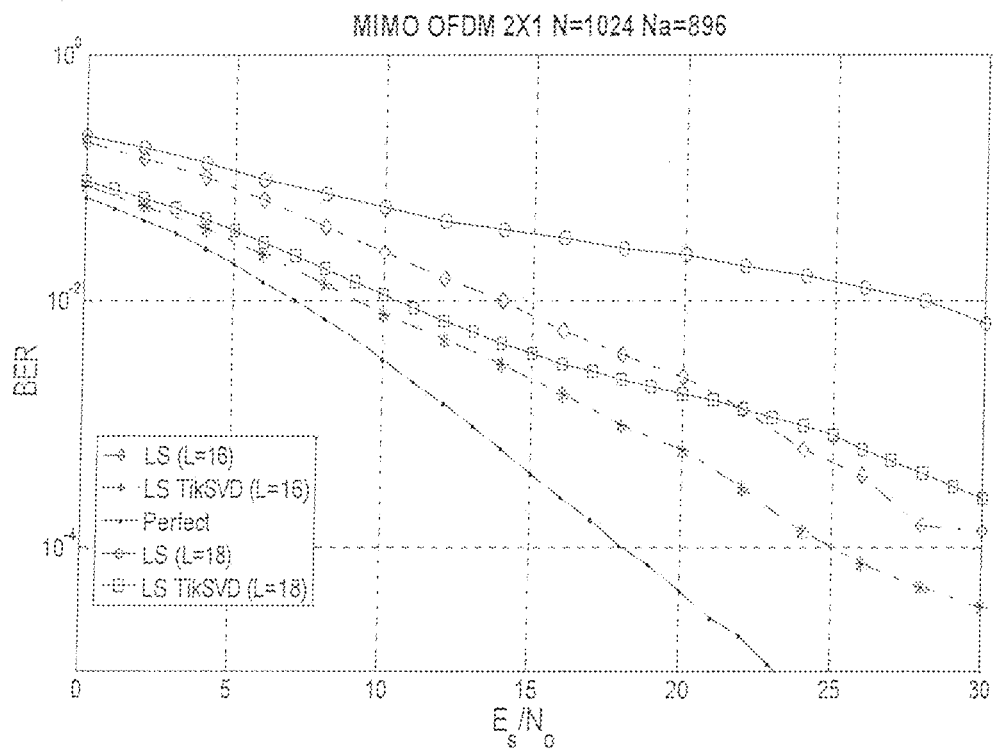
FIG. 11 illustrates the BER performance comparison of the LS_TikSVD and conventional. LS.

FIGS. 10 and 11 show the average MSE performance of channel estimation and the BER performance of the system, for the optimum alpha range.

Compared to the NMSE of conventional LS, the proposed LS_TikSVD can provide approximately 7 dB and 18 dB gains in low $E_s/N_o$ range (from 0 dB to 15 dB) for L=16 and L=18, respectively. Whereas for higher $E_s/N_o$ ranges (above 15 dB) the noise contribution is significantly lower but the contribution of high cond is still present therefore the performance is improving although at lower rate of approximately 2.5 dB and 5dB for L=16 and L=18, respectively.

Taking the BER performance as a comparison metric, FIG. 11 shows that LS_TikSVD clearly outperforms the LS counterpart. Comparing the two methods at BER of $10^{-4}$ for CIR length L=16 LS_TikSVD provides gain of 5 dB. For CIR length L=18 at BER of $10^{-2}$ the performance gain is approximately 15 dB and increases with increase of $E_s/N_o$.

Figure 12:
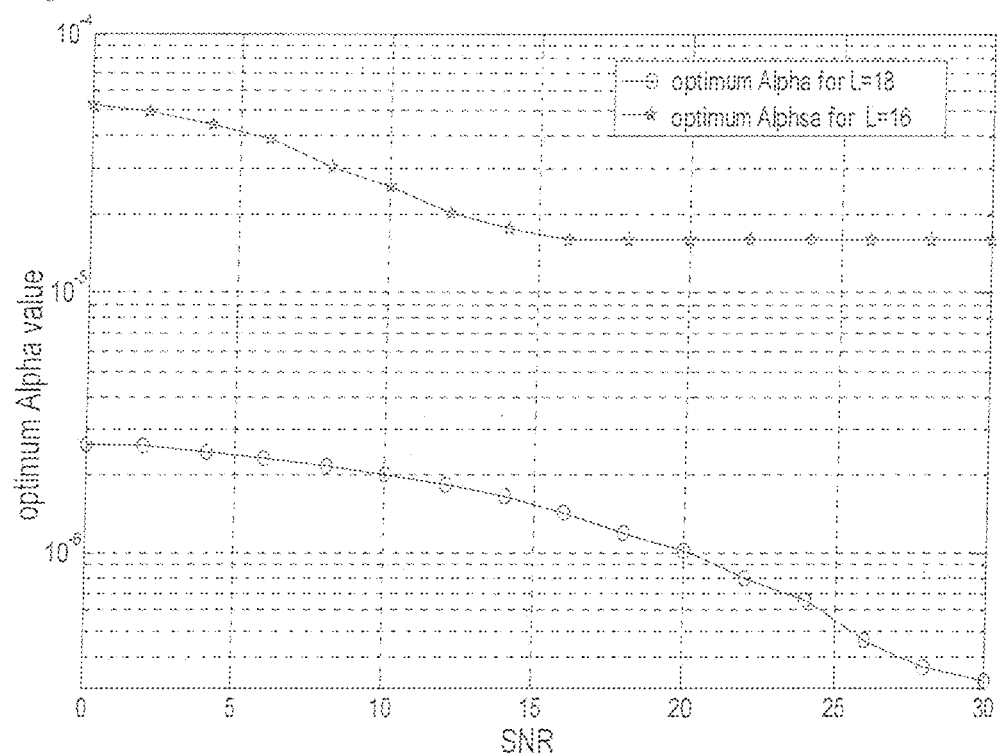
FIG. 12 illustrates average optimum alpha values for both CIR lengths L=16 and L=18.

FIG. 12 shows the average optimum regularization parameters selected from the LS_TikSVD to achieve the performance gains in FIG. 10 and FIG. 11.

As a complexity metric the number of complex multiplications and additions is considered. The inverse of a m×m matrix requires $O(n^3)$ operations, the multiplication of two matrices m×n and n×p requires O(2 nmp) and the product of matrix (m×n) and vector (n) requires and O(2 mn) operations.

The conventional LS estimation with virtual carriers would require $O(N_t^3 L^3)$ operations. We define $n^3=N_t^3 L^3$ for case of notation, therefore conventional LS requires $O(n^3)$ operations, otherwise for. LS we need $O(n^2(n+1)2/3-(7/6)n)$.

The proposed LS_TikSVD operates in two phases: In the first phase of the algorithm it would be required to have normalized A (i.e. $\overline{A}$) and its SVD factorisation SVD($\overline{A}$) that requires $O(n^2+n)$ and $O(2n^3)$ operations respectively, but both can be computed off-line and only once as A depends only on the pilot symbols, thus adding no complexity effort on the estimation algorithm. Thereafter, in the second phase: with a predetermined optimum, alphas range, the complexity in the second phase is $O(2n^2(\theta+1)+n\theta)$ operations, here θ is the reduced number of regularization parameters taken from the optimum alphas range. To make a fair comparison of the algorithm of the invention it is compared to the LS using SVD factorization (LS_SVD) where a pre-computed SVD (as in the inventive LS_TikSVD) is assumed, which requires $O(4n^2-n)$ operations.

The table below shows computational complexity of conventional LS (Gaussian eliminations), LS with pre-computed SVD and LS_TikSVD channel estimations.

| Estimator type | O (*) operations |
| --- | --- |
| Conventional LS (Gaussian) | $n^2(n + 1)2/3 - (7/6)n$ |
| LS_SVD (pre computed svd) | $4n^2 - n$ |
| LS_Tik_SVD | $2n^2(\theta + 1) + n\theta$ |

The proposed algorithms complexity increases linearly with θ and can be kept low (approaching LS_SVD) for good estimation of optimum alphas range. Thus the complexity increase is related to additional matrix multiplication that won't significantly increase the computation time.

In conclusion the inverse problem has been analysed in an LS channel estimation for MIMO OFDM systems. It is shown that by ignoring the poorly-conditioned matrix in the inverse problem of LS channel estimation can significantly degrade the performance gains. The invention includes a modified LS algorithm (LS_TikSVD) to solve the inverse problem and obtain the best channel estimate from SVD implementation of Tikhonov regularized least squares solution. The approach of the current invention to estimate the optimum regularization parameter enables the efficient implementation of LS_TikSVD and significantly outperform the conventional LS. The simulations show that the proposed algorithm not only achieves smaller MSE on channel estimation and reduced bit error rate than the conventional LS channel estimation but also matches its level of channel estimation complexity.

It will be appreciated by persons skilled in the art that the present invention may also include further additional modifications made to the device which does not affect the overall functioning of the device.

SEQUENCE LISTING

Not Applicable

The invention claimed is:

1. A method of channel estimation comprising:
 a first phase of locating an optimum regularisation parameters range from an initially larger range; and
 a second phase of obtaining optimum channel estimates from a Tikhonov regularized least squares solution using the optimum regularisation parameters range located from the first phase.

2. A method according to claim 1 wherein the Tikhonov regularized least squares solution is used for the next Orthogonal Frequency Division Multiplexing (OFDM) blocks.

3. A method according to claim 2 wherein the Tikhonov regularised least squares solution is used for the next OFDM blocks only if a channel impulse response length remains unchanged.

4. A method according to claim 3 wherein an estimate of the channel impulse response length is 16 or 18.

5. A method according to claim 1 wherein in the first phase, the optimum regularization parameter range is estimated from the initially larger range.

6. A method according to claim 1 wherein in the second phase the optimum regularization parameter range from the first phase is used in the computation of the best channel estimate by singular value decomposition (SVD) implemented Tikhonov regularised least square solution (LS_TikSVD).

7. A method according to claim 6 wherein a modified LS channel estimation is provided by applying singular value decomposition implementation of Tikhonov regularization.

8. A method according to claim 1 wherein the optimum regularisation parameters range is unchanged while a channel tap length is constant.

9. A method according to claim 1 wherein performance increases are achieved in either or both of the mean square error (MSE) of channel estimation and/or bit error rate (BER) performance of a system in comparison to a conventional Least Square (LS) channel estimator.

10. A method according to claim 1 wherein a linear problem is solved using an LS_TikSVD algorithm.

11. A method according to claim 10 wherein a Tikhonov Filtering method with respect to the LS_TikSVD algorithm is performed.

12. A method according to claim 1 wherein the method of channel estimation is utilised by a broadcast data receiver.

13. A method according to claim 12 wherein the broadcast data receiver is provided to receive broadcast digital data fro one or more digital data transmitting locations and processing at least selected portions of said received digital data in response to a user request to generate video and/or audio and/or auxiliary services therefrom.

* * * * *